(12) United States Patent
Sheidler et al.

(10) Patent No.: US 8,001,771 B2
(45) Date of Patent: Aug. 23, 2011

(54) DUAL ENGINE WORK VEHICLE WITH CONTROL FOR EXHAUST AFTERTREATMENT REGENERATION

(75) Inventors: Alan D. Sheidler, Moline, IL (US); Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 487 days.

(21) Appl. No.: 12/188,462

(22) Filed: Aug. 8, 2008

(65) Prior Publication Data

US 2010/0031638 A1 Feb. 11, 2010

(51) Int. Cl.
*F01N 3/00* (2006.01)
*F01N 5/04* (2006.01)

(52) U.S. Cl. ............... 60/286; 60/274; 60/280; 60/295; 60/297

(58) Field of Classification Search ............ 60/273, 60/274, 280, 295, 297, 718; 123/DIG. 8
See application file for complete search history.

(56) References Cited

U.S. PATENT DOCUMENTS

| | | | | |
|---|---|---|---|---|
| 6,066,897 A | * | 5/2000 | Nakamura | 290/4 A |
| 7,152,705 B2 | * | 12/2006 | Alster et al. | 180/65.245 |
| 7,155,334 B1 | * | 12/2006 | Stewart et al. | 701/114 |
| 2006/0174609 A1 | * | 8/2006 | Heath | 60/289 |

FOREIGN PATENT DOCUMENTS

| | | |
|---|---|---|
| DE | 60119469 T2 | 11/2006 |
| EP | 1640201 A1 | 3/2006 |

OTHER PUBLICATIONS

The above reference had no. English X,Y,A citations.

* cited by examiner

*Primary Examiner* — Thomas E Denion
*Assistant Examiner* — Patrick Maines
(74) *Attorney, Agent, or Firm* — Taylor IP, PC

(57) ABSTRACT

A work machine having dual compression ignition engines each driving motor generators providing a power output to selective loads. The compression ignition engines each have an exhaust aftertreatment device requiring regeneration in accordance with a selected parameters. A controller controls motor/generators or hydraulic pump/motors associated with the diesel engines to either transfer load between one or the other of the motor/generators or pump/motors to impose a load on one of the engines sufficiently high to produce passive regeneration. In the event that loads driven by the motor/generators or pump/motors are too low, one of the engines may be shut off or the loads increased.

30 Claims, 1 Drawing Sheet

DUAL ENGINE WORK VEHICLE WITH CONTROL FOR EXHAUST AFTERTREATMENT REGENERATION

FIELD OF THE INVENTION

The present invention relates to work machines and more particularly to work machines including an internal combustion engine which may be used to drive primary and secondary loads.

BACKGROUND OF THE INVENTION

A work machine, such as a construction, agriculture or forestry work machine typically includes a power unit in the form of an internal combustion (IC) engine. The IC engine may either be in the form of a compression ignition engine in which the heat of compression ignites timed and quantity selected fuel for combustion or a spark ignition engine in which a homogenous mixture is ignited by an ignition source or a homogenous charge compression ignition engine which is a hybrid of the former two. For most heavy work machines, the power unit is in the form of a diesel engine providing better torque, power and durability characteristics for work operations.

The emissions regulations set forth in the original Environmental Protection Agency (EPA) laws have initially been applied to on highway vehicles. In recent years, the EPA regulations have been applied to off-highway vehicles such as work machines. The issues faced by on-highway diesel engine applications are now being faced by off-highway applications.

In the usual applications, this requires an exhaust aftertreatment device which receives the products of combustion from the internal combustion engine and treats it appropriately to remove a combination of nitrous oxides, particulates and other hydrocarbons. These devices inherently require periodic regeneration to remove particulates or carbon matter so as to restore the aftertreatment device to a substantially new condition. This is necessary to maintain the effectiveness of treating the products of combustion so as to maintain both the letter and spirit of the EPA laws.

The issue of regeneration becomes difficult when applied to work machines in the sense that the machines are constantly being utilized to perform an industrial or agricultural function. Any regeneration effort must not prevent continued operation of the machine so that it can achieve its intended purpose, namely the industrial or agricultural function.

A number of efforts have been made to achieve regeneration and these include raising the temperature of the products of combustion to the exhaust aftertreatment device sufficiently so that any extra carbon is burned off. The devices to achieve this can be heaters, ultrasonic devices and adding hydrocarbons to the exhaust stream to achieve the temperatures required for regeneration.

Unfortunately, all of these approaches require energy beyond that necessary for the particular duty cycle of the work machine. In particular, adding hydrocarbons in the form of fuel decreases the fuel efficiency and therefore the effectiveness of the work machine. Devices incorporating heaters or ultrasonic devices require additional power sources to drive the temperature increasing function. Nowhere is the need for efficiency greater than in an agricultural machine having a duty cycle that varies between one of maximum load and such as driving a combine through a field and simultaneously harvesting, collecting and processing the harvested agricultural material. The opposite of this maximum load is the time in-between actual harvesting when the engine is operating at a small fraction of the maximum power available to the device.

What is needed in the art therefore, is a work machine that utilizes internal combustion engines and which efficiently and effectively regenerates exhaust aftertreatment devices associated with the internal combustion engines.

SUMMARY OF THE INVENTION

In one form the invention is a work machine having a first air-breathing fuel consuming internal combustion (IC) engine providing a power output in producing products of combustion. The first IC engine has a first exhaust aftertreatment device receiving products of combustion from the first IC engine and requires periodic regeneration in response to a first aftertreatment device parameter. A second air-breathing fuel consuming internal combustion (IC) engine provides a power output and produces products of combustion. The second IC engine has a second exhaust aftertreatment device receiving products of combustion from the second IC engine and requiring periodic regeneration and response to a second aftertreatment device parameter. First and second devices are respectively mechanically connected to the first and second IC engines, the first and second devices being configured to each drive at least one load. Finally, a controller is configured for selective bi-directional transfer of power between the first and second devices in response to the first and second aftertreatment device parameters to selectively increase the load on one of the first and second IC engines in regenerating the aftertreatment device receiving products of combustion from the IC engine.

In another form, the invention is a method of operating a work machine having first and second air-breathing fuel consuming internal combustion (IC) engines providing a power output and producing products of combustion. Each of the IC engines has an exhaust aftertreatment device receiving products of combustion from the respective IC engine and requiring periodic regeneration in response to an aftertreatment device parameter. The method includes steps of driving a first device with the first IC engine, the first device driving at least one load. Driving a second device with the second IC engine, the second device driving at least one load. The method includes the final step of bi-directionally transferring power between the first and second devices in response to the aftertreatment device parameters to produce regeneration in one of the exhaust aftertreatment devices.

DETAILED DESCRIPTION OF THE INVENTION

Figure 1:
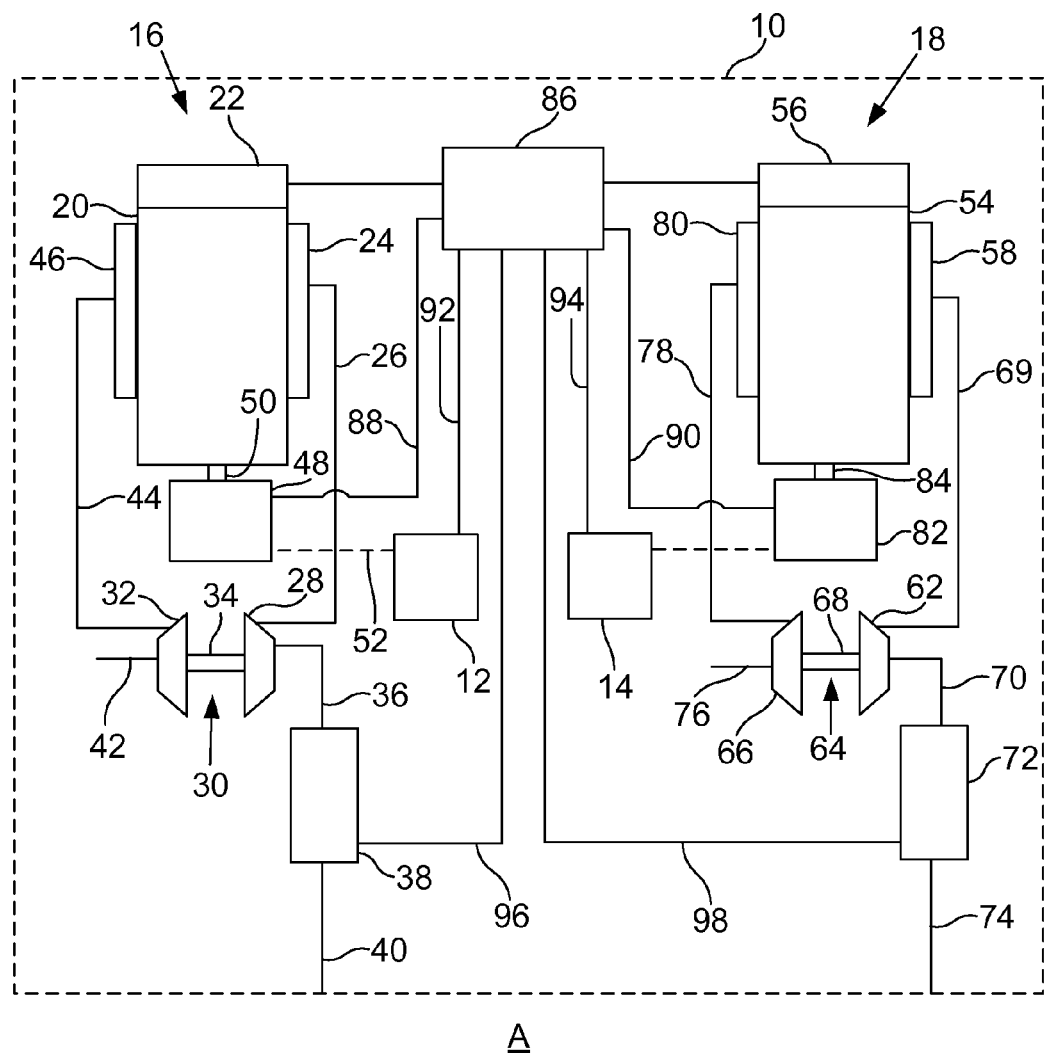
FIG. 1 shows a schematic diagram of a work machine incorporating apparatus according to the present invention.

FIG. 1 shows, in schematic fashion, a work machine 10 in accordance with the present invention. Work machine 10 has first and second loads 12 and 14 driven by first and second propulsion units 16 and 18. Loads 12 and 14 may be a variety of demands from primary propulsion of the work vehicle 10 to auxiliary functions and in the case of agricultural work machines, harvesting and processing functions. Depending upon the configuration of the components set forth below, the loads 12 and 14 may be in the form of transmissions or electric motors or hydromechanical devices.

The first propulsion unit 16 comprises an engine 20 having a plurality of cylinders in which pistons reciprocate to provide a rotary output by interconnection with a crank shaft, all of which is not shown to simplify the understanding of the present inventions. Engine 20 is an air breathing, fuel consuming, engine in which a fuel system, generally indicated by 22, injects fuel into the combustion chambers for the appropriate combustion event. The products of combustion pass through an exhaust manifold 24 and through an exhaust line 26 to a turbine 28 of a turbo-charger 30. The turbine 28 is mechanically connected to a compressor 32 via an interconnecting shaft 34. The turbine 28 extracts energy from combustion gases flowing through line 26 and the gases from the turbine 28 pass through line 36 to an exhaust aftertreatment device 38 and line 40 to ambient A.

The compressor 32 receives inlet air from ambient A via line 42 and compresses it for delivery through a line 44 to intake manifold 46 supplying air to engine 16. It should be noted that an after cooler or intercooler (not shown) is typically provided in line 44 to reduce the temperature of the pressurized gases and therefore the density of the charge for additional power. The engine 20 is mechanically coupled to a device 48, which will be described in detail below, by a shaft 50. The device 48 is interconnected with load 12 by an appropriate connection indicated by line 52.

Propulsion unit 18 has an engine 54 that is also fuel consuming and air breathing. A fuel system 56 provides metered and timed fuel to be injected a plurality of cylinders in which pistons reciprocate to provide a rotary output. The internal elements are not shown to simplify the understanding of the present invention. The products of combustion from engine 54 pass through an exhaust manifold 58 through line 60 to the turbine 62 of a turbocharger 64. Turbine 62 drives a compressor 66 by a mechanical interconnection 68. The gases exiting from turbine 62 pass through line 70 to an exhaust aftertreatment device 72 and finally a line 74 to ambient A.

The compressor 66 receives ambient air from line 76 and pressurizes it for delivery via line 78 and intake manifold 80 to engine 54. Engine 54 provides an output to a device 82 via mechanical interconnection 84.

A controller 86 is connected to device 48 by interconnection 88 and to device 82 by interconnection 90. The controller 86 is also interconnected with load 12 by line 92 and load 14 by line 94. Controller 86 also has signal lines 96 and 98 receiving signals from exhaust aftertreatment devices 38 and 72, respectively.

In accordance with the present invention, the controller 86 is configured to transfer loads between engines 20 and 54 in response to signals from exhaust aftertreatment devices 38 and 72 via lines 96 and 98 to provide effective and efficient operation of the work machine for the exhaust aftertreatment devices. In one form, the devices 48 and 82 are motor/generators mechanically driven from their respective engines 20 and 54 but which are not mechanically interconnected. The motor/generators respectively drive loads 12 and 14 which perform various functions in the work machine 10.

The controller 86 may be an ECM that responds to signals from exhaust aftertreatment devices 38 and 72 to maintain proper operation. When exhaust aftertreatment devices 38 and 72 are diesel particulate filters, it is necessary to periodically regenerate the filters so as to burn off accumulated carbon particles. The controller 86 is configured so that appropriate inputs cause the controller to transfer load to either engine 20 or 54 as appropriate so that the temperature adjacent exhaust aftertreatment device 38 or 72 is approximately 300° Celsius. At this point the carbon particle will combust and be burned off of the filter.

The criteria for initiating the transfer of power may be any one of a number of parameter indicators. Such indicators may be: 1. after a predetermined operating time; 2. after a predetermined operating time at given loads; 3. a predetermined pressure drop across the exhaust aftertreatment device; 4. a predetermined inlet pressure to the device; 5. a predetermined inlet temperature to the device. Various combinations of the signals may be employed to properly transfer a load from one of the engines to the other through the devices 48 and 82.

The work machine 10 is subjected a variety of loads during it duty cycle. In cases when the loads are not so high it is necessary to utilize both engines 20 and 54, the load may be transferred to one of the two engines and the other shut off to provide the temperature necessary for regeneration. If the point in the duty cycle where the loads are below that of one of the two engines, the loads 12 or 14 may be artificially increased to cause the exhaust temperature to reach the regeneration limit. This may be the artificial adding of load. In the case of motor/generators this can be done by charging a battery, energizing a heater or other accessory device such as an unloading system.

Alternatively, the devices 48 and 82 may be pump/motor combinations and the controller 86 configured so that power may be bi-directionally directed between the devices 48 and 82 in order to effect the appropriate temperature in the exhaust lines to achieve regeneration. In this case, if the duty cycle experiences a load sufficient to be driven by one of the engines, power is transferred totally to that engine and the other engine may be shut down to load the operating engine to achieve the regeneration temperatures. In the event that the load in the duty cycle at that point is even lower, artificial loads may be added at 12 or 14 by actuating various hydraulic pumps and motors to increase the load.

The regeneration of the exhaust aftertreatment device may be controlled by the controller 86 in response by appropriate signals from lines 96 and 98 to stop regeneration after a predetermined burnout or a variable determined by particular operating parameters.

While the exhaust aftertreatment devices 38 and 72 have been described as diesel particulate filters they may also be catalytic converters, selective catalytic reduction (SCR) devices or diesel oxidation catalysts (DOC). In each case, a parameter from the device is used by the controller 86 to achieve the appropriate transfer load from one engine to the other.

The net effect of the system described above is that regeneration of the exhaust aftertreatment devices and efficient operation thereof may be achieved without the need to add hydrocarbons or other devices to increase exhaust aftertreatment device temperature to the point where regeneration occurs. This provides a significant benefit in fuel economy, since for compression ignition engines, regeneration of particulate filters is an operation that occurs with significant frequency. Furthermore the regeneration of the exhaust aftertreatment devices may be occurring while the work machine 10 is functioning for its intended purpose, thus avoiding unnecessary interruption of the work activity.

Having described the preferred embodiment, it will become apparent that various modifications can be made without departing from the scope of the invention as defined in the accompanying claims.

The invention claimed is:
1. A work machine comprising:
a first air breathing, fuel consuming internal combustion (IC) engine providing a power output and producing products of combustion, said first IC engine having a first exhaust aftertreatment device receiving products of combustion from said first IC engine and requiring periodic regeneration in response to a first aftertreatment device parameter;

a second air breathing, fuel consuming internal combustion (IC) engine providing a power output and producing products of combustion, said second IC engine having a second exhaust aftertreatment device receiving products of combustion from said second IC engine and requiring periodic regeneration in response to second aftertreatment device parameter;

first and second devices respectively mechanically connected to said first and second IC engines, said first and second devices being configured to each drive at least one load; and a controller configured for selective bi-directional transfer of power between said first and second devices in response to said first and second aftertreatment device parameters to selectively increase the load on one of the first and second IC engine for regenerating the aftertreatment receiving products of combustion from said IC engine.

2. The work machine as claimed in claim 1, wherein said exhaust aftertreatment devices are one of a diesel particulate filter, catalytic converter, selective catalytic reduction device and diesel oxidization catalyst.

3. The work machine as claimed in claim 1, wherein said load is increased to maintain approximately 300° C. in said exhaust aftertreatment device.

4. The work machine as claimed in claim 3, wherein said load is increased for up to approximately twenty minutes.

5. The work machine as claimed in claim 1, wherein said exhaust aftertreatment device is a diesel particulate filter and said parameter is temperature of said diesel particulate filter.

6. The work machine as claimed in claim 1, wherein said parameter is a predetermined time interval.

7. The work machine as claimed in claim 1, wherein said parameter is a function of time and load.

8. The work machine as claimed in claim 1, wherein said exhaust aftertreatment device is a diesel particulate filter and said parameter is a differential pressure across said diesel particulate filter.

9. The work machine as claimed in claim 1, wherein said parameter indicates fouling of said exhaust aftertreatment device.

10. The work machine as claimed in claim 1, wherein said exhaust aftertreatment device is a diesel particulate filter and said parameter is a function of inlet pressure to said diesel particulate filter.

11. The work machine as claimed in claim 1, wherein the loads on said devices are selectively increased to provide regeneration of said exhaust aftertreatment device.

12. The work machine as claimed in claim 1, wherein said exhaust aftertreatment device is regenerated for a predetermined time interval.

13. The work machine as claimed in claim 1, wherein the regeneration of exhaust aftertreatment device is determined by a predetermined parameter.

14. A method of operating a work machine having first and second air breathing fuel consuming internal combustion (IC) engines providing a power output and producing products of combustion, each of said IC engines having an exhaust aftertreatment device receiving products of combustion from said respective IC engine and requiring periodic regeneration in response to an aftertreatment device parameter, said method comprising the steps of:
  driving a first device with said first IC engine, said first device driving at least one load
  driving a second device with said second IC engine, said second device driving at least one load;
  bi-directionally transferring power between said first and second devices in response to said aftertreatment device parameters to produce regeneration in one of said exhaust aftertreatment devices.

15. The method as claimed in claim 14, wherein said exhaust aftertreatment device is one of a diesel particulate filter, catalytic converter, selective catalytic reduction device and diesel oxidization catalyst.

16. The method as claimed in claim 14, wherein said engine feeding the exhaust aftertreatment device is loaded to heat the aftertreatment device to approximately 300° C.

17. The method as claimed in claim 16, wherein said load is applied for up to approximately twenty minutes.

18. The method as claimed in claim 14, wherein said exhaust aftertreatment device is a diesel particulate filter and the parameter is the temperature of the diesel particulate filter.

19. The method as claimed in claim 14, wherein the parameter is time.

20. The method as claimed in claim 14, wherein the parameter is a function of time and driven load.

21. The method as claimed in claim 14, wherein the aftertreatment device is a diesel particulate filter and the parameter is the differential pressure across the filter.

22. The method as claimed in claim 14, wherein the parameter is one indicating fouling of the exhaust aftertreatment device.

23. The method as claimed in claim 14, wherein the exhaust aftertreatment device is a diesel particulate filter and the parameter is a function of the inlet pressure to said diesel particulate filter.

24. The method as claimed in claim 14, wherein the loads on said devices are selectively increased to provide loading for said regeneration.

25. The method as claimed in claim 14, wherein the exhaust aftertreatment devices regenerated for a predetermined temperature.

26. The method as claimed in claim 14, wherein regeneration is determined by a predetermined parameter.

27. The method as claimed in claim 14 wherein said devices are motor/generators.

28. The method as claimed in claim 14, wherein said devices are hydraulic pump/motors.

29. The work machine as claimed in claim 1, wherein said devices are motor/generators.

30. The work machine as claimed in claim 1, wherein said devices are hydraulic pump/motors.

\* \* \* \* \*